United States Patent [19]
Stephens

[11] Patent Number: 5,701,969
[45] Date of Patent: Dec. 30, 1997

[54] FRAME BEAMING REDUCTION ASSEMBLY

[75] Inventor: Donald L. Stephens, LaConner, Wash.

[73] Assignee: PACCAR Inc., Bellevue, Wash.

[21] Appl. No.: 441,771

[22] Filed: May 16, 1995

[51] Int. Cl.⁶ .................................................. B60K 5/00
[52] U.S. Cl. .......................... 180/300; 180/299; 248/638
[58] Field of Search .......................... 180/291, 58, 298,
180/299, 300, 68.4; 165/69; 280/781, 786;
296/194; 248/562, 638

[56] References Cited

U.S. PATENT DOCUMENTS

| | | | |
|---|---|---|---|
| 2,020,597 | 11/1935 | Appel | 180/291 |
| 3,229,951 | 1/1966 | Quick | 248/358 |
| 3,395,769 | 8/1968 | Julien | 180/291 |
| 3,966,009 | 6/1976 | Meacock, II et al. | 180/41 |
| 4,391,435 | 7/1983 | Pham | 267/140.1 |
| 4,424,961 | 1/1984 | Takei | 248/562 |
| 4,538,697 | 9/1985 | Muroi et al. | 180/300 |
| 4,593,786 | 6/1986 | Tate | 180/291 |
| 4,624,435 | 11/1986 | Freudenberg | 180/300 |
| 4,673,156 | 6/1987 | Tabata | 248/638 |
| 4,721,292 | 1/1988 | Saito | 267/140.1 |
| 4,725,046 | 2/1988 | Sugino | 267/140.1 |
| 4,802,648 | 2/1989 | Decker et al. | 267/140.1 |
| 4,821,828 | 4/1989 | Schwerzler et al. | 180/300 |
| 4,867,263 | 9/1989 | Sugino et al. | 180/291 |
| 4,930,743 | 6/1990 | Ishimaru et al. | 180/291 |
| 4,989,894 | 2/1991 | Winsor et al. | 280/690 |
| 5,017,328 | 5/1991 | Mazurek | 267/136 |
| 5,083,756 | 1/1992 | Tobias | 267/136 |
| 5,088,572 | 2/1992 | Schroeder et al. | 180/300 |
| 5,454,443 | 10/1995 | Fischle et al. | 180/312 |

FOREIGN PATENT DOCUMENTS

| | | | |
|---|---|---|---|
| 652498 | 3/1965 | Belgium | 248/562 |
| 189631 | 9/1985 | Japan | 248/562 |
| 235218 | 10/1986 | Japan | 180/300 |
| 363067439 A | 3/1988 | Japan | 180/312 |

OTHER PUBLICATIONS

*Car and Driver,* 1993 Truck Buyer's Guide, pp. 26–27.

Reed, F. Everett, "Dynamic Vibration Absorbers and Auxiliary Mass Dampers," *Shock and Vibration Handbook: Second Edition,* C.M. Harris and C.E. Crede, eds, McGraw–Hill, pp. 6–1 to 6–17 and 6–23 to 6–27.

*Primary Examiner*—Kevin Hurley
*Assistant Examiner*—Min Yu
*Attorney, Agent, or Firm*—Seed and Berry LLP

[57] ABSTRACT

A frame beaming reduction assembly for use with a motor vehicle to eliminate or reduce the amplitude of frame beaming oscillations in a vehicle's frame caused by vibratory forces exerted on a motor vehicle. The assembly includes a frame having a beaming frequency in a first range of frequencies, and an engine is attached to the frame wherein the engine generates engine vibration that has a second range of frequencies that is different than the first range of frequencies. A spring is positioned between a cross member of the frame and a forward engine mount of the engine. A damper formed by a pair of shock absorbers is positioned between the frame and a second forward engine mount substantially parallel to the spring such that the combination of the damper, the spring, and the engine has an offsetting frequency that is substantially equal to the frame's beaming frequency and that offsets the beaming frequency. The frame beaming reduction assembly effectively reduces the amplitude of the beaming frequency to approximately zero, whereby the frame beaming frequency oscillations are canceled and do not negatively impact the ride of the vehicle.

14 Claims, 2 Drawing Sheets

FRAME BEAMING REDUCTION ASSEMBLY

TECHNICAL FIELD

The present invention relates to vibration assemblies for use on a vehicle, and more particularly to vibration reducing assemblies that reduce frame vibration to provide a smooth ride.

BACKGROUND OF THE INVENTION

Long-haul trucks and other automotive vehicles experience a significant amount of vibration during operation as the vehicle travels over rough and uneven roadways. One of the most important factors in the ride of a heavy truck is the degree of oscillator/motion that occurs in the frame of the truck as a result of vibrator/forces exerted on the frame, particularly oscillator/motion at the frame's natural frequency. Oscillatory motion of the frame's natural frequency is known as frame beaming.

The frame of a heavy truck is typically a pair of metal channels with cross members therebetween, and the major components of the truck are fastened to this frame, including the engine, cab, fuel tanks, radiator, fifth wheel, and the suspension systems. Frame beaming is excited by the range of vibrator/forces transmitted to the frame as the truck travels over periodic road features, like cracked and tilted concrete slabs. Frame beaming is also excited by movement of components mounted to the frame, such as rotation of the wheel equipment, particularly if the wheel equipment is out of round or out of balance.

In a conventional heavy truck, the front and rear ends of the frame are free ends, and the oscillation of the frame during frame beaming is the first bending mode of the frame, and such oscillation is a substantially harmonic oscillation. Accordingly, the frame vibrates at a relatively low frequency with two stationary nodal points that occur at the point about one-quarter of the length of the frame from each of the front and rear ends. At least one portion of the truck's cab is attached to the frame at a position away from the nodal points that experiences vertical movement due to the oscillation of the frame, and that vertical motion of the frame is transmitted to the cab. As a result, the driver experiences the oscillatory motion as a fore and aft pitching motion of the cab during operation of the vehicle. The magnitude of the fore and aft pitching motion is enhanced due to the driver's elevated position in the cab above the frame. This pitching motion is annoying and uncomfortable to the driver or a passenger in the truck, particularly on long trips.

There have been a number of efforts to reduce the vibration felt by the driver as a result of frame beaming, including the use of air suspension seats, and modified suspension systems designed to reduce the fore/aft pitching. Wheels have also received attention in that many current tires and wheels are marked at their eccentric points so that the eccentricities can be offset against each other during assembly to reduce oscillatory vibration transmitted to the frame. In addition, frames have been made with greater stiffness or with stiffeners attached to the frame to minimize frame vibration. A further device used to reduce the fore and aft pitching caused by frame beaming is a cab suspension system between the truck's cab and the frame to prevent frame vibration and other road disturbances from reaching the driver.

Other devices for reducing vibration transmitted to the vehicle frame are used at the mounting between the engine and the frame. A plurality of resilient, vibration-absorbing devices, such as rubber pads or the like, are installed between the frame and engine mounts on the vehicle's engine. These devices are designed to absorb vibration generated from the engine in order to prevent such engine vibration from being transmitted to the frame. However, engine vibration is of a higher frequency than the frequency of frame beaming. While the rubber pads or other engine vibration-absorbing devices may absorb or reduce the higher frequency engine vibration, these devices do not control the lower frequency vibration of frame beaming.

SUMMARY OF THE INVENTION

The present invention provides a frame beaming reduction assembly that reduces frame beaming in a vehicle. In a preferred embodiment of the invention, the frame beaming reduction assembly is an auxiliary mass damping system that includes a frame assembly, an engine coupled to the frame assembly, and a spring and damper between the engine and the frame assembly. The frame assembly has a pair of laterally spaced frame rails and cross members extending between the frame rails. The frame assembly has a relatively low beaming frequency. The engine has at least one mounting portion connected to the spring and the damper. The spring and the damper are connected to the frame assembly between the frame assembly and the engine, and the spring and the damper support a portion of the engine's weight on the frame, such that the engine provides an auxiliary mass to react the spring and the damper. The spring and the damper are combined with the engine to provide a combination having an offsetting frequency that is substantially equal to the beaming frequency and that offsets the beaming frequency. As a result, the amplitude of the beaming frequency is reduced to approximately zero, and the driver does not feel the fore and aft pitching that is otherwise detectable during undamped frame beaming.

In the preferred embodiment of the invention, the engine has forward mounting portions and rear mounting portions. The spring and the damper are located between the forward mounting portions and the forward cross member of the vehicle frame. The damper has a predetermined damping constant and the spring member has a predetermined spring rate, such that the damper and the spring in combination with the auxiliary mass of the engine provide the offsetting frequency that is substantially equal to, and 180° out of phase with, the beaming frequency. Accordingly, the combination of the spring member, damping member, and auxiliary mass of the engine reduces frame beaming.

DETAILED DESCRIPTION OF THE INVENTION

Figure 1:
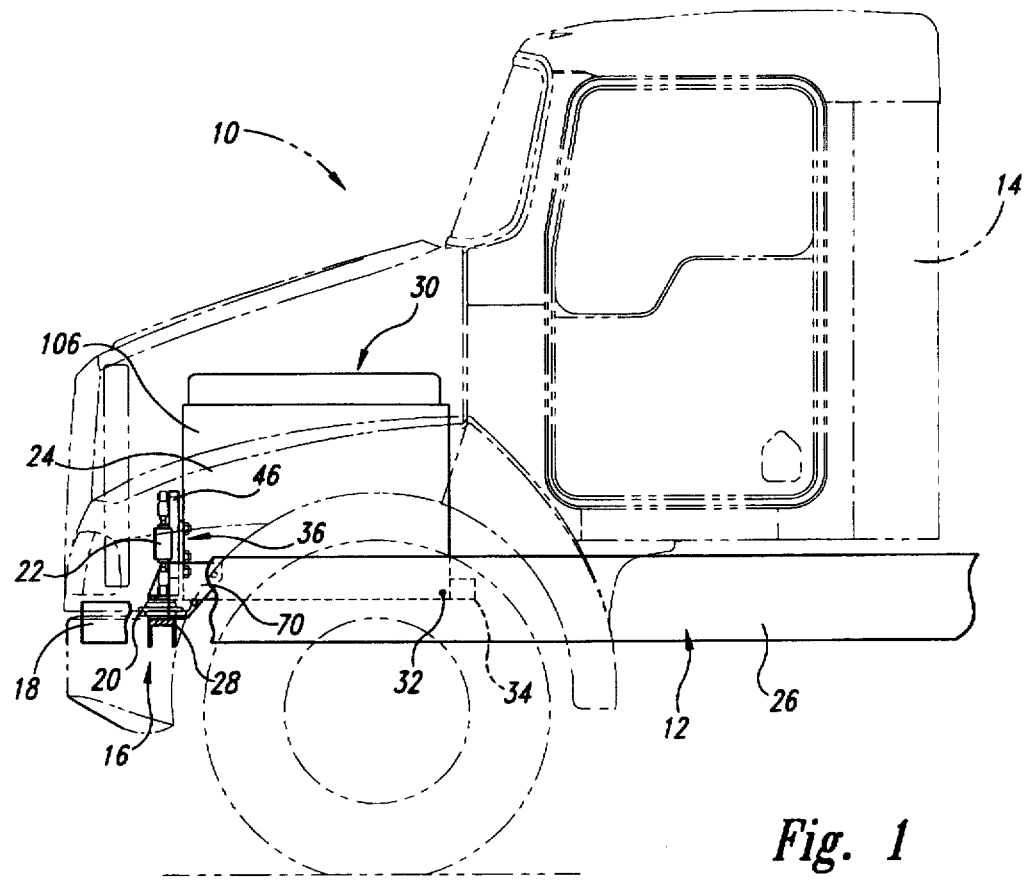
FIG. 1 is a schematic partial side elevation view of a truck having a frame beaming reduction assembly in accordance with the preferred embodiment.

A long-haul truck 10 illustrated in FIG. 1 has a frame 12 that supports a cab 14 and a frame beaming reduction assembly 16 in accordance with the present invention at a front portion 18 of the frame. As discussed below, a preferred embodiment of the frame beaming reduction assembly 16 includes a spring 20 and a damper 22 that are connected to an engine 24 of the truck 10 and to the front portion 18 of the frame 12 to provide a combination of the engine, the spring, and the damper that has an offsetting frequency which offsets the frequency of the oscillatory motion that occurs in frame beaming. The effect of the frame beaming reduction assembly 16 is to isolate the front of the engine 24 such that if the frame 12 tries to vibrate, it is resisted by the spring 20, the damper 22, and the mass of the engine.

The frame 12 of the truck 10 is a structure that includes a pair of laterally spaced frame rails 26 extending substantially along the length of the truck. Cross members 28 of the frame 12 extend between the frame rails 26 and are secured at each end to the frame rails. The frame 12 is the central structural component of the truck 10 that supports the other truck components, including the cab 14, suspension systems, a fifth wheel, the power plant, which includes the engine 24 and the transmission, and many other components. As the truck 10 travels over a roadway, the frame 12 is subjected to a wide variety of vibratory forces that result from, as an example, the wheels of the truck moving over rough and uneven surfaces. Such vibratory forces are transmitted through the truck's suspension system to the frame 12. Other vibratory forces exerted on the frame 12 are caused by cyclical moving components of the truck 10 that are out of balance or out of round, such as the motion within the engine 24.

These vibratory forces transmitted to the frame 12 cause the frame to bend in a first mode of bending thereby resulting in vibratory frame oscillations, known as frame beaming. The vibrator frame oscillation has a substantially resonant frequency at the frame's natural frequency. These vibratory frame oscillations at the beaming frequency are substantially harmonic such that the front portion 18 of the frame 12, as well as the middle portion and the rear portion of the frame, will move vertically up and down during undamped frame beaming. The portion of the frame 12 at a forward nodal point 32 which is located approximately one-quarter of the length of the truck's frame 12 away from the frame's front portion 18, is substantially stationary and has no relative vertical movement, even during undamped frame beaming. However, during frame beaming, positions along the frame 12 that are distant from the forward nodal point 32 tend to experience a range of vertical motion.

The truck's frame 12 has a resonant frame beaming frequency in the range of 4 cycles/second (Hertz) to 10 cycles/second (Hertz), and more typically in the range of 5 Hertz to 8 Hertz. The exact frequency depends on a number of design factors and can be measured for each design as needed. The frame beaming reduction assembly 16 of the preferred embodiment includes the combination of the engine 24, which provides a relatively large auxiliary mass, the spring 20, and the damper 22 that generates an offsetting frequency substantially equal to the beaming frequency and approximately 180° out of phase with the beaming frequency. Accordingly, the frame beaming reduction assembly 16 reduces the amplitude of vertical motion in the frame 12 to substantially zero. As a result, components connected to the frame 12 of the truck 10, such as the cab 14 and the like, experience no vertical oscillatory displacement due to frame beaming. Therefore, the driver of the truck 10 experiences a very smooth ride.

The engine 24 of the preferred embodiment is a six-cylinder diesel engine that weighs approximately 4000 pounds, and the engine provides a large auxiliary mass for the frame beaming reduction assembly 16 that reacts the damper 22 and the spring 20. The engine 24 generates a significant amount of engine vibration because of, as an example, mass imbalances during rotation of engine parts, and because of the multiple firing within the engine during each cycle. The frequency of the engine vibration during operation is in a range of 16 Hertz at slow idle speed to 105 Hertz at elevated speeds of the engine. Accordingly, the range of engine vibration frequencies is different and higher than the range of frame beaming frequencies.

The engine 24 has rear engine mounts 34 and forward engine mount parts 36 that are adapted to be securely attached to the frame 12. The rear engine mounts 34 are connected to the frame 12 in a conventional manner at a position that approximately corresponds to the first nodal point 32. The rear engine mounts 34 are adapted to carry a portion of the engine's weight and to resist substantially all of the torque loads and side loads generated by the engine 24 during operation.

Figure 2:
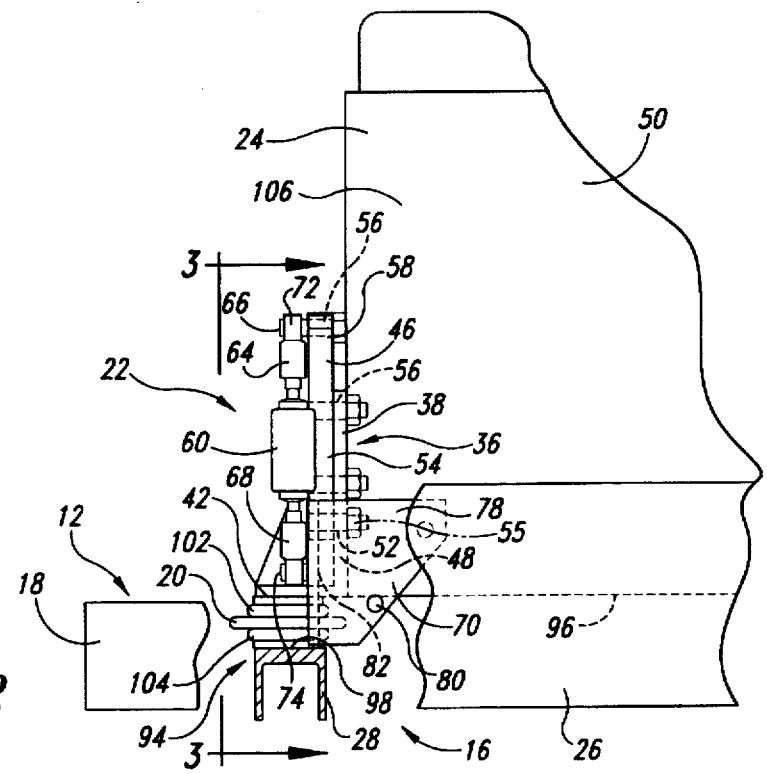
FIG. 2 is an enlarged side elevation view of the frame beaming reduction assembly of FIG. 1 with an engine coupled to the frame of the truck by an air spring and shock absorbers connected to front mounts of the engine.
Figure 3:
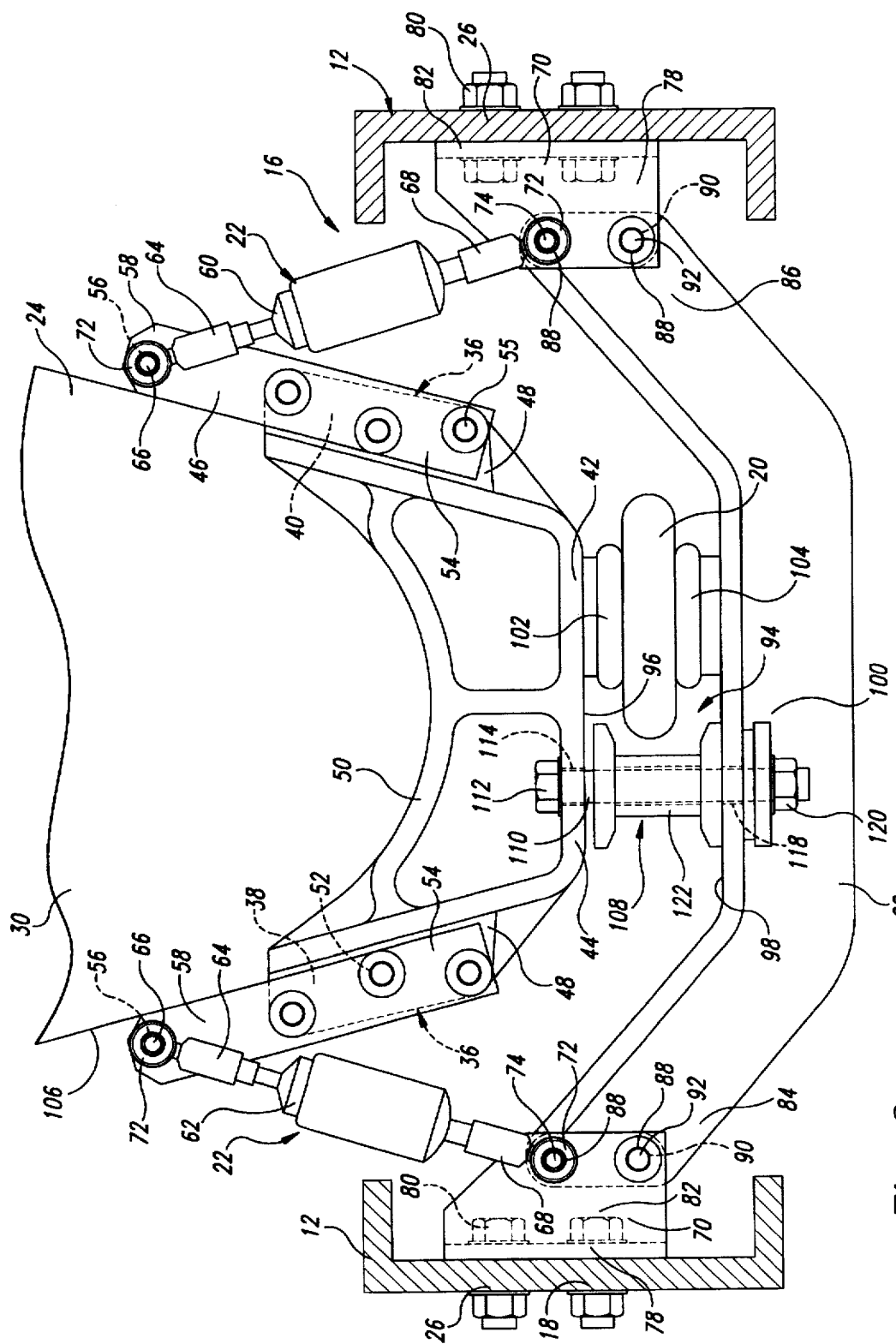
FIG. 3 is an enlarged front elevation view of the frame beaming reduction assembly of FIG. 1 with an engine coupled to the frame of the truck by an air spring and shock absorbers attached to front mounts of the engine.

As best seen in FIGS. 2 and 3, the engine 24 has a plurality of forward engine mount pans 36, including a left damper mount 40, a right damper mount 38, and first and second adjacent center mounts 42 and 44. The left and right mounts 40 and 38 each have a mounting plate 46 bolted or otherwise securely fastened to a flange 48 extending outwardly from the respective left and right side of the block bracket 50 of the engine 24. Each of the mounting plates 46 has a plurality of apertures 52 in a bottom portion 54 of the mounting plate that are adapted to receive fasteners 55 that rigidly connect the mounting plate to the engine block bracket 50.

An upper aperture 56 is formed in a top portion 58 of each mounting plate 46 for connecting the mounting plate to respective left and right shock absorbers 60 and 62 that comprise the damper 22. A top portion 64 of each of the left and right shock absorbers 60 and 62 is securely attached to the respective mounting plate 46 by a fastener 66 that extends through the shock absorber's top portion and through the upper aperture 56 in the mounting plate. As illustrated in FIG. 3, each of the left and right shock absorbers 60 and 62 extend downwardly from its mounting plate 46 and securely fasten at a bottom portion 68 to the cross member 28 of the frame 12 and to a knee bracket 70 that connects the cross member to the frame rails 26.

In the preferred embodiment, each of the left and right shock absorbers 60 and 62 is a 1.375 inch, short-stroke shock having a stroke of approximately 0.99 inches and having steel ball end connectors 72 to minimize springiness of the shocks, thereby facilitating their damping characteristics. The combination of the left and right shock absorbers 62 and 60 provide a damping constant in the range of 40 lb./in./sec. to 100 lb./in/sec. The 1.375 inch, short-stroke shocks of the preferred embodiment provide a damping constant in the range of 50 lb./in./sec. and 60 lb./in/sec. and more particularly, an optimum damping constant of 55 lb./in./sec. for the particular illustrated embodiment. The steel ball connectors 72 on the bottom portion 68 of each of the left and right shock absorbers 62 and 60 is fastened with a fastener 74 to the respective knee bracket 70.

As best seen in FIG. 3, each knee bracket 70 is an L-shaped bracket with a first leg 78 that is securely fastened to a respective frame rail 26 with a pair of fasteners 80. A second leg 82 of the knee bracket 70 extends inwardly away from the frame rail 26 and connects to a respective left and right end 84 and 86 of the frame's cross member 28. The second leg 82 of the knee bracket 70 has a pair of apertures 88 therein that are coaxially aligned with a pair of apertures 90 in each of the left and right side ends 86 and 84 of the cross member 28. Fasteners 74 and 92 extend through the apertures 88 and 90 and rigidly connect the cross member 28 to the respective knee brackets 70. The apertures 88 in the second leg 82 of the knee bracket 70 are vertically offset below the fasteners 80 securing the knee bracket to the frame rail 26. Accordingly, the cross member 28 is connected to the frame rails 26 in a lowered position to provide a space 94 between the bottom surface 96 of the engine block bracket 50 and a top surface 98 of the cross member.

The cross member 28 is a shallow V-shape with a lower, flat middle portion 100 positioned below the engine block bracket 50 with a space 94 between the bottom surface 96 of the engine block and the top surface 98 of the cross member. The spring 20 is located within the space 94, and a top portion 102 of the spring is securely connected to the engine's block bracket 50 at the first center engine mount 42. A bottom portion 104 of the spring 20 is securely fastened to the middle portion 100 of the cross member 28 such that the spring spans the space 94 and supports the forward portion 106 of the engine 24. Accordingly, the spring 20 and the left and right shock absorbers 62 and 60 are positioned substantially in parallel, and the front portion 106 of the engine 24 is resiliently supported above the cross member 28 by the spring.

In the preferred embodiment, the spring 20 is an air spring that provides vibration absorption between the engine 24 and the middle section 100 of the cross member 28. The airs spring 20 has a height control air valve (not shown) that slowly adds to or removes air from the air spring to control the air spring's installed height, in a manner well-known for air spring installations. The air spring 20 has a spring rate in the range of 1500 lb./in. to 3500 lb./in A preferred range of the spring rate is 2250 lb./in to 2750 lb./in., with the optimal spring rate being 2500 lb./in. for use in combination with the left and right short stroke shock absorbers 60 and 62 discussed above and with the approximately 4000 lb. six cylinder diesel engine. Thus, the damper 22 formed by the two shock absorbers 62 and 60 and spring 20 in combination with the mass of the engine 24 results in an auxiliary mass damping system with the engine being the auxiliary mass to react the dampers and spring to offset the frame beaming of the frame 12. Further, the combination of the engine 24, the spring 20, and the damper 22 provides a frame beaming reduction assembly 16 that is broadly tuned such that variations of damping constant and spring rate within the identified ranges can be used while effectively eliminating or reducing frame beaming. This system is thus useful for many different truck designs.

Referring again to FIG. 3, the frame beaming reduction assembly 16 has a travel stop 108 located adjacent to the spring 20 in the space 94 between the engine block bracket 50 and the cross member 28. The travel stop 108 includes a block member 122 and an alignment bolt 110 extending through the block member. The alignment bolt 110 is connected to the engine bracket 50 at the second center mount 44. The alignment bolt 110 extends from an enlarged upper head portion 112 through an aperture 114 in the engine block bracket 50 at the second center mount 44, through an aperture 116 in the block member 122, and through an aperture 118 in the middle portion 100 of the cross member 28. A nut 120 or the like is attached to the end of the alignment bolt 110 below the middle portion 100 of the cross member 28 to prevent the alignment bolt from pulling through the aperture 118 in the cross member's middle portion. The alignment bolt 110 effectively limits the relative vertical movement of the engine 24 away from the frame 12.

The block member 122 is a rigid, steel body having a spindle shape with a height that is less than the height of the space 94 between the engine 24 and the cross member 28. Accordingly, the engine 24 can move vertically relative to the top surface 98 of the cross member 28 a distance corresponding to the difference in the heights of the block member 122 and the bottom of the engine block bracket 50. When the engine block bracket 50 moves toward the cross member 28 to the position that corresponds to the top of the block member 122, the block member will engage the bottom surface 96 of the engine block bracket 50 and prevent further relative motion of the engine.

In the preferred embodiment, the vertical travel range of the engine 24 relative to the cross member 28 is approximately ±0.25 inches. In an alternate embodiment not illustrated, the left and right shock absorbers 62 and 60 provide travel limits for movement of the engine 24 relative to the cross member 28 such that the travel stop 108, discussed above, can be eliminated.

Accordingly, the leer and right shock absorbers 62 and 60 connect the forward portion 106 of the engine 24 to the cross member 28, and the combination of the shock absorbers provides a damper between the engine and the frame 12. The weight of the engine 24 effectively reacts the left and right shock absorbers 62 and 60 to facilitate damping by the shock absorbers. Although the preferred embodiment described above uses two short-stroke shock absorbers to provide damping between the front of the engine and the cross member, other dampers or a single damper having a selected damping constant could be used between the engine and the cross member. The dampers may also be attached to the frame rails 26 rather than the cross member to provide the desired damping.

In an alternate embodiment of the present invention the frame beaming reduction assembly 16 has an air spring 20 positioned between the center mount 42 of the engine block bracket 50 and the cross member 28 of the frame 12 to form a dynamic vibration absorbing system. The air spring 20 provides both a slight damping function and a spring function. The air spring 20 is combined with the mass of the engine 24 to provide a combination having an offsetting frequency that is substantially equal to the beaming frequency and that offsets the beaming frequency. Such offsetting of the beaming frequency effectively reduces the amplitude of the harmonic oscillations of the frame 12 that occur in frame beaming.

The alternate embodiment uses a lone air spring 20 to provide a single member that acts as a spring and a very small damper, and the resulting dynamic vibration absorbing system is fairly narrowly tuned because of the small amount of damping. Thus, small variations in the spring rate for the narrowly tuned system can adversely impact the system, for example, by resulting in an offsetting frequency that does not totally offset the frame beaming frequency. Accordingly, the spring rate must be selected very carefully with respect to the remaining components of the frame beaming reduction assembly, including the engine mass, the frame beaming frequency, the frame, and the like, to provide an offsetting frequency that is equal to, and out of phase with, the frame beaming frequency.

The dynamic vibration absorbing system of this alternate embodiment using the lone air spring 20 results in the development of two additional vibrations that are exerted on the frame 12, including a frequency oscillation in the frame that is higher than the frame beaming frequency discussed above, and a lower frequency of engine oscillation. As a result, the dynamic vibration absorbing system with an undamped spring arrangement of the alternate embodiment is effective to offset the frame beaming frequency, particularly in a vehicle that is not adversely effected by the two additional vibrations. However, the dynamic vibration absorbing system is not as broadly tuned as the frame beaming reduction system of the preferred embodiment with the spring and damper arrangement.

Numerous modifications and variations of the frame beaming reduction system invention disclosed herein will occur to those skilled in the art. Therefore, it is to be understood that such modifications and variations can be practiced while remaining within the spirit and scope of the invention as defined by the following claims.

I claim:

1. An auxiliary mass damping system for use on a motor vehicle to reduce frame beaming caused by vibratory forces exerted on the motor vehicle, comprising:

a frame assembly having laterally spaced frame rails and a cross member extending between said frame rails, said frame assembly having a beaming frequency in a first range of frequencies;

an engine attached to said frame assembly, said engine having first mounting portions and second mounting portions, said engine being an auxiliary mass of said auxiliary mass damping system, said engine generating engine vibration during operation of said engine, said engine vibration having a second range of frequencies that is different than said first range of frequencies;

a spring member disposed between said cross member of said frame assembly and a first of said first mounting portions;

a damping assembly disposed between said frame assembly and a second of said first mounting portions of said engine, said damping assembly and said spring member being combined with said auxiliary mass to provide a combination having an offsetting frequency that is substantially equal to said beaming frequency and that offsets said beaming frequency.

2. The auxiliary mass damping system of claim 1 wherein said first mounting portions are front engine mounts located at a forward portion of said engine, said damping assembly and said spring member being secured between said front engine mounts and frame.

3. The auxiliary mass damping system of claim 1 wherein said beaming frequency is within said first range of frequencies of 4 Hertz to 10 Hertz, said engine vibration is within said second range of frequencies of 16 Hertz to 105 Hertz, and said offsetting frequency is within the range of 4 Hertz to 10 Hertz.

4. The auxiliary mass damping system of claim 1 wherein said beaming frequency is within said first range of frequencies of 5 Hertz to 8 Hertz, said engine vibration is within said second range of frequencies of 20 Hertz to 90 Hertz, and said offsetting frequency is within the range of 5 Hertz to 8 Hertz.

5. The auxiliary mass damping system of claim 1 wherein said frame assembly moves in an oscillatory motion and said oscillatory motion has at least one nodal point along said frame, and said spring member, said damping assembly and said first mounting portions of said engine are located away from said nodal point.

6. The auxiliary mass damping system of claim 1 wherein said spring member has a spring rate in the range of 1500 lb./in. and 3500 lb./in. and said damping assembly has a damping constant in the range of 40 lb./in/sec and 100 lb./in/sec.

7. The auxiliary mass damping system of claim 1 wherein said spring member is an air spring.

8. The auxiliary mass damping system of claim 1 wherein said damping assembly is a shock absorber.

9. The auxiliary mass damping system of claim 1, wherein said damper assembly includes first and second dampers disposed between said auxiliary mass and said frame assembly.

10. The auxiliary mass damping system of claim 1, further comprising a travel stop between said frame assembly and at least one of said first mounting portions, said travel stop positioned to stop said engine from moving in a vertical direction past a predetermined distance from said cross member of said frame.

11. A dynamic vibration absorbing system on a motor vehicle for reducing frame beaming caused by vibratory forces exerted on the motor vehicle, comprising:

a frame assembly having laterally spaced frame rails and a cross member extending between said frame rails, said frame assembly having a beaming frequency in a range of 4 Hertz to 10 Hertz;

an engine having a mounting portion coupled to said frame assembly, said engine being an auxiliary mass of said dynamic vibration absorbing system, said engine generating engine vibration during operation of said engine, said engine vibration being in the range of 16 Hertz to 105 Hertz; and a spring member disposed between said mounting portion of said engine and said frame assembly, said spring member being positioned to absorb said vibration of said frame assembly, said spring member being combined with said engine to provide a combination having an offsetting frequency that is substantially equal to said beaming frequency and that offsets said beaming frequency.

12. The dynamic vibration absorbing system of claim 11 wherein said mounting portion is a front mount on a forward portion of said engine, and said spring member is attached to said front mount and to said cross member of said frame assembly.

13. The dynamic vibration absorbing system of claim 11 wherein said spring has a spring rate in the range of 1500 lb./in. to 3500 lb./in.

14. The dynamic vibration absorbing system of claim 11 wherein said spring member is an air spring.

* * * * *